United States Patent [19]

Gates

[11] 3,936,682
[45] Feb. 3, 1976

[54] GAS BEARING REACTION WHEEL

[75] Inventor: Robert Lee Gates, Littleton, Colo.

[73] Assignee: Martin Marietta Corporation, New York, N.Y.

[22] Filed: Sept. 14, 1972

[21] Appl. No.: 289,028

[52] U.S. Cl............................... 310/66; 308/10
[51] Int. Cl. ............................................. H02k 7/00
[58] Field of Search ........ 310/66, 112, 114; 308/10; 74/5

[56] References Cited
UNITED STATES PATENTS

| | | | |
|---|---|---|---|
| 1,469,094 | 9/1923 | McComiskey | 310/66 |
| 1,677,331 | 7/1928 | Chessin | 310/66 |
| 2,822,694 | 2/1958 | McKenney | 308/10 |
| 2,913,701 | 11/1959 | Wachholz | 308/10 |

Primary Examiner—R. Skudy
Attorney, Agent, or Firm—Sughrue, Rothwell, Mion, Zinn & Macpeak

[57] ABSTRACT

An intermediate rotatable member is driven at relatively high speed about a common axis and is concentrically positioned between first and second relatively rotatable members, one of which is bidirectionally driven with respect to the other. Hydrodynamic fluid bearings are carried by the intermediate member on both surfaces thereof and acting on the first and second members, thus even upon cessation of motion, between said first and second members, there is no loss of the hydrodynamic fluid bearings between the first, second and third members.

12 Claims, 4 Drawing Figures

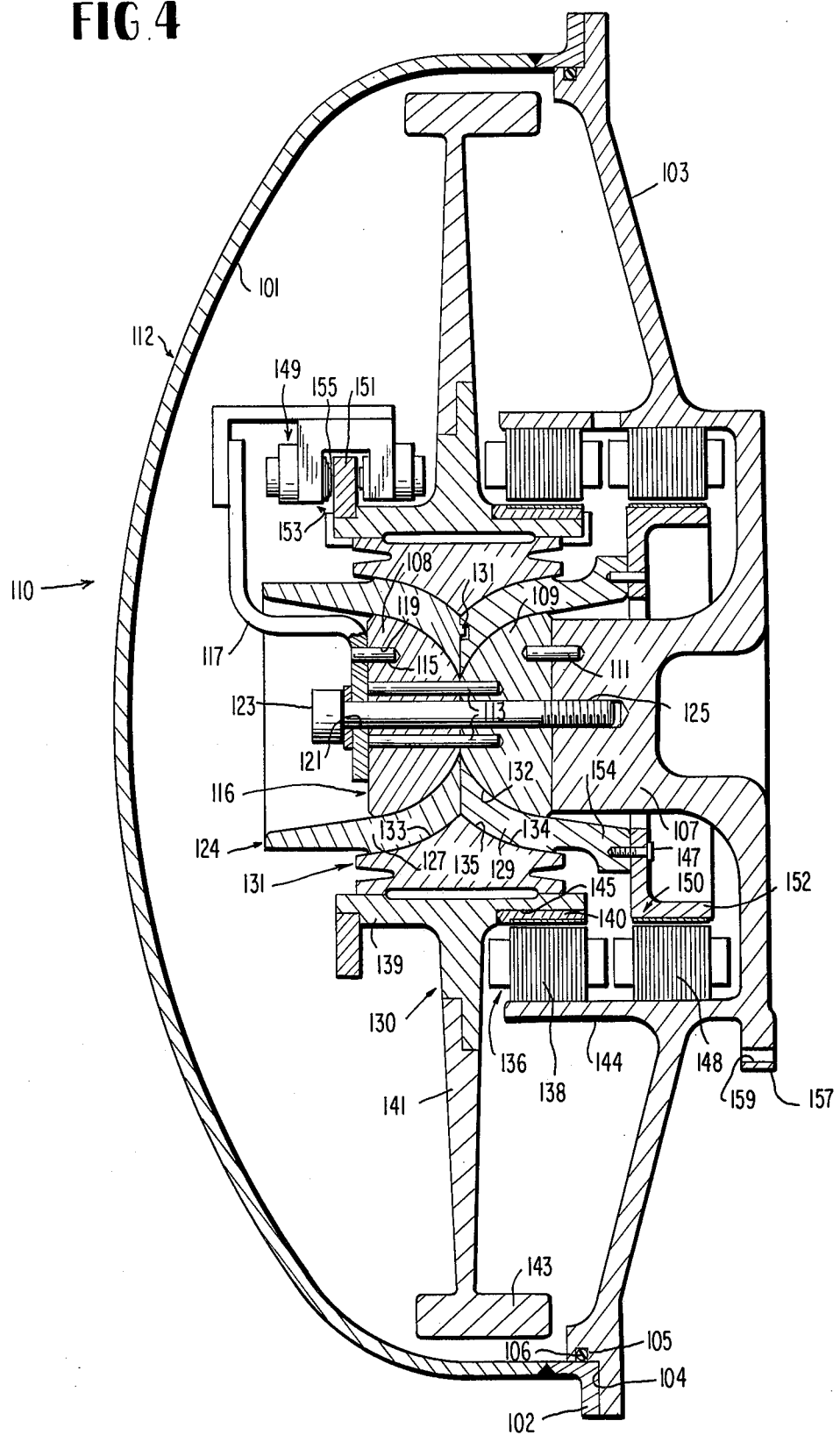

GAS BEARING REACTION WHEEL

BACKGROUND OF THE INVENTION

1. Field of the Invention

This invention relates to momentum exchange actuator systems such as gyroscopes and the like, and more particularly to a reaction wheel for space craft applications.

2. Description of the Prior Art

Reaction wheels or similar inertial reference system components are employed to exert stabilization torques in control systems such as those required on spacecraft. Reaction wheels may further be used to cause the desired attitude changes of such vehicles. Since spacecraft may occupy space for considerable periods of time and may be unattended during this period, the multiple axis stabilization control systems must be active and alive for time periods in excess of 10 years. Further, the high precision pointing requirements of such vehicles require control devices with extremely low noise levels.

Where electrical power is continuously available, gas bearing rotors are attractive for long life advantages. Conical, spherical, or journal and thrust, vented or non-vented bearings with precision etched grooves in the bearing surfaces operate on a thin gas film which, of course, requires no lubrication or external pressure supplies. Theoretically, it is possible to operate indefinitely a hydrodynamic air or gas bearing without degradation, particularly where it is not permitted to "touch down", so that once relative rotation occurs between the wheel and its support, there is an absence of sliding contact. Recent developments in gas bearing technology have yielded significant advances in load capability which is essential for a saturated reaction wheel subject to rates normal to the spin axis.

Such wheels must be capable of being rotated in either direction or even stopped. This defeats the advantage of conventional hydrodynamic gas bearings, because when the bearing surfaces approach zero relative velocity, the hydrodynamic gas film support is lost and the surfaces rub and slide to a stop, causing a finite wear to the mechanism and eventual failure. Furthermore, because of the necessity for the wheel to be rotated bidirectionally, it is difficult to cause functional designs in terms of the etched grooves which will induce a superambient support pressure, regardless of the direction of rotation.

In contrast, conventional reaction wheel technology employs ball bearings on the rotation axis. Ball bearings have limited and somewhat unpredictable life spans, with the chief limitation residing in lubrication breakdown or failure of the lubricant retainer as by fracture or flaking.

SUMMARY OF THE INVENTION

The present invention is directed to a momentum exchange actuator system which includes relatively rotatable, first and second generally concentric members mounted for rotation about a common axis, with means for driving one member bidirectionally with respect to the other about said axis. At least one intermediate member is positioned between the first and second members and generally concentric thereto for rotation about the common axis, and means are provided for driving the intermediate member at a constant speed which is substantially faster than that of the driven first and second member when the intermediate member is rotated in the same direction as the driven first and second member. Hydrodynamic air bearing means are carried by the intermediate member on both surfaces thereof and act respectively on the first and second members. Therefore, regardless of cessation of motion between the first and second members, or change in the direction of motion between the first and second members, there is no loss in the hydrodynamic air bearing between the intermediate member and the first and second members, thereby eliminating the possibility of touch down.

In one embodiment, a fixed shaft supports a fixed inner member which, in turn, supports the intermediate member or middle spin structure, which defines in conjunction with the relatively rotatable and driven outer member or reaction wheel, inner and outer gas spin bearings therebetween. A brushless D.C. or A.C. type reaction wheel drive motor has an annular stator fixed to the inner member and an annular rotor surrounding the stator and fixed to the reaction wheel to one side of the inner and outer gas spin bearings, while the intermediate or middle spin structure is rotated at high speed by a middle spin bearing motor preferably of the hysteresis synchronous alternating current type, whose annular stator is fixed to the inner member on the opposite side of the gas spin bearing from the reaction wheel drive motor. The annular rotor of the middle spin bearing motor is fixed to the intermediate or middle spin structure and spaced slightly from the fixed rotor.

In a second embodiment, the middle spin structure comprises a pair of intermediate rotatable members, each driven by a separate middle spin bearing motors in opposite directions at relatively high speed with the reaction wheel incorporating two electrical driving motors on each side thereof, axially outside of the middle spin bearing motors. The two middle spin members are rotated in opposite directions at a high, constant speed, but in opposite directions to substantially balance the torque of the middle spin structure. To reduce fabrication tolerance problems, the capability of the inertial system may be achieved by employing a number of small wheel modules for each spin axis.

BRIEF DESCRIPTION OF THE DRAWINGS

FIG. 4 is a sectional view of a momentum exchange actuator forming a practical embodiment of the invention similar in form to that of FIG. 1.

DESCRIPTION OF THE PREFERRED EMBODIMENT

Figure 1:
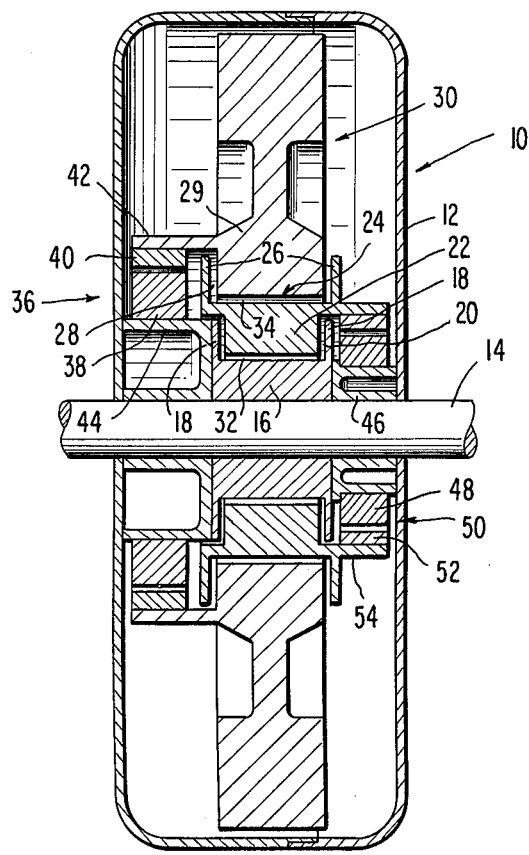
FIG. 1 is a sectional, schematic view of a momentum exchange actuator of the present invention in one form.

Referring to FIG. 1, in one schematic form, a momentum exchange actuator system of the present invention has application to space vehicle guidance and control systems in which, for a given spin axis, there is provided a reaction wheel assembly or momentum exchange actuator indicated generally at 10, which comprises a hermetically sealed case or housing 12 through which projects a shaft 14 which, in this case, is fixed and supported by means (not shown). Mounted on shaft 14, in fixed position, is a first cylindrical member 16 which carries flanges 18 at either end which define an enlarged peripheral gap or recess 20. Recess 20 receives an annular projecting portion 22 of an intermediate, second cylindrical member 24 which is positioned concentric to member 16 for relative rotation about a common axis defined by shaft 14. In turn, the intermediate member 24 is provided with axially spaced, radially directed flanges 26, which define an annular peripheral recess or gap 28 within which is received inner rim 29 of an annular reaction wheel or inertial rotor 30 which forms the third and outermost, relatively rotatable member of the system. In the embodiment shown, which shaft 14 and inner member 16 fixed, there is defined by the intermediate member 24, an inner gas spin or hydrodynamic bearing 32 between member 16 and intermediate member 24 and an outer gas spin or hydrodyanmic bearing 34 between the inner periphery of the reaction wheel 30 and the outer periphery of the intermediate member 24.

The creation of the hydrodynamic air or gas bearings 32 and 34 between the peripheries of members 16, 24 and 30, respectively, is conventional and forms no part of the present invention. Regardless of the direction of rotation of the reaction wheel 30 with respect to the fixed shaft 14 and the fixed inner member 16, there is no loss of hydrodynamic air bearings, this being due to a structural arrangement which will be described in detail hereinafter. Alternatively other fluids such as grease may exist within the air gaps for greater load capability.

It is noted that the outer periphery of the reaction wheel 30 is spaced slightly from the fixed casing 12. Further, in order to achieve the aims of the present invention, the reaction wheel 30 is driven in either direction by a reaction wheel drive motor indicated generally at 36 to the left of the reaction wheel. The motor 36 may be essentially of the brushless D.C. or A.C. type and include an annular stator 38 which is fixedly positioned relative to a concentric, radially spaced motor rotor 40, which, in turn, is fixed to an axially projecting flange 42 of the reaction wheel 30. Annular support 44, which is fixed to shaft 14, positions the stator 38 axially to the left of the reaction wheel 30, the intermediate member 24 and the inner fixed member 16 of the inertial system.

On the opposite side of the casing 12, there is provided another annular support 46, which is fixed to shaft 14 and supports stator 48 of a middle spin bearing motor 50 which may be of the hysteresis, synchronous alternating current type or brushless D.C. type, the motor 50 further including an annular rotor 52 which is fixed to an axially projecting flange 54 of the intermediate member 24. It is also noted that the middle spin bearing motor is positioned axially beyond and to the right of the reaction wheel and the intermediate and inner members of the inertial system.

It is a requirement of the invention that the intermediate member or middle spin structure be driven at a speed which is substantially higher than the angular velocity given to the reaction wheel 30 by the reaction wheel drive motor 36 when it is driven in the same direction as the intermediate member 24. As in all hydrodynamic gas bearings, it is the relative rotation between members which creates the air or gas bearing. SInce the intermediate rotary member 24 is always driven at a speed higher than the rotatably driven reaction wheel 30, regardless of cessation of motion of the reaction wheel 30 relative to the fixed axis 14 and the fixed inner member 16 or the direction of rotation of the same, there is no loss in the hydrodynamic inner and outer gas bearings 32 and 34, and thus under no circumstances will there be contact between intermediate member 24 and the fixed inner member 16 or the reaction wheel 30 after start-up. Thus, as long as the inertial reaction rotor angular velocity does not approach that of the middle spin structure, it will remain continuously supported on the self-induced gas film. Since the inertial rotor or reaction wheel 30 is accelerated by its own separate motor 36, which is secured to shaft 14, the reaction wheel 30 can be driven to the required angular velocity in either direction or held motionless without bearing touch down. Further, while the embodiment of FIG. 1 is illustrated in terms of a rotatable reaction wheel and a fixed internal inner member 16 in a fixed shaft 14, it is envisioned that the reaction wheel could be fixed and that inner member 16 could be driven as would be the intermediate member 24; in this case, the inner member 16 being bidirectionally rotated but driven at a speed somewhat less than the very high speed of the intermediate member 24 with again the intermediate member 24 functioning to create and sustain the hydrodynamic bearings.

Figure 2:
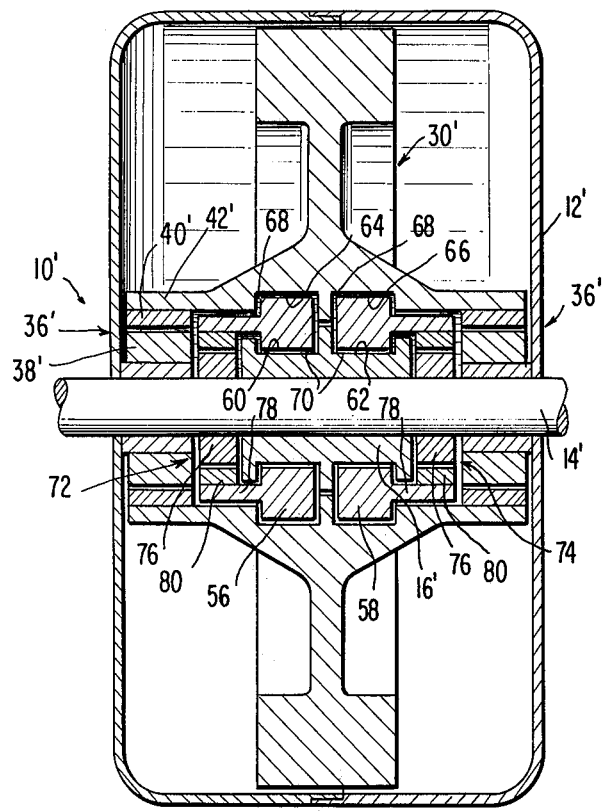
FIG. 2 is a sectional, schematic view of a second embodiment of the invention.

Reference to FIG. 2 illustrates an alternate embodiment in which like elements are given similar, primed numerical designations. The reaction wheel assembly 10' of this embodiment, constitutes an arrangement to insure balance of the windage and bearing torques of the middle spin structure especially under zero torque condition. Essentially, casing 12' fixedly supports a central shaft 14' which, in turn, is provided with a relatively fixed inner member 16' and in similar manner to the embodiment of FIG. 1 is provided with a reaction wheel 30' as the outer, relatively rotatable member of the basic three member unit. Instead of a single middle spin structure or intermediate member, there is provided two, similar middle spin structures which are again driven at a constant relatively high speed but in opposite sense, which eliminates the torque balance problems. In this case, there are provided left and right hand intermediate members 56 and 58 which are annular in form and are mounted within peripheral recesses 60 and 62 to the left and right of a vertical center line passing through the center of the reaction wheel 30', recesses 60 and 62 being provided within the outer periphery of the relatively fixed inner member 16'. Recesses 64 and 66 are provided within the inner periphery of the reaction wheel 30', thus reaction wheel 30' is mounted for rotation on outer gas spin bearings 68, while the intermediate member in turn is mounted for rotation on inner gas bearing 70, the hydrodynamic air bearings being formed by both intermediate members 56 and 58.

In similar fashion to the prior described embodiment, a reaction wheel drive motor 36' is provided on the left hand side of the assembly, comprising an annular stator 38' fixed to the shaft 14 to the left side of intermediate members 56, while the reaction wheel 30' is provided with an axial extension 42', to the inner periphery to which is fixed the reaction wheel drive motor rotor 40'. Further, middle spin bearing motor 72 is provided to drive the intermediate rotary member 56 at the left hand side of the assembly, while a similar motor 74 is provided on the right hand side, both motors having annular stators 76 fixed to the shaft 14, while axial, cylindrical extensions 78 of the intermediate rotary members 56 and 58 respectively have fixedly attached to the inside of the same, concentric and vertically aligned, spaced middle spin bearing motor rotors 80. Motors 72 and 74 are energized so as to drive the intermediate rotary members 56 and 58 at high speeds but in opposite directions. The intermediate members 56 and 58 generate hydrodynamic bearings 68 and 70 on respective surfaces regardless of the direction and extent of rotation of the reaction wheel 30' with respect to the fixed inner member 16'. Preferably, the reaction wheel drive motors 36' on each side of the assembly are of the brushless direct current type, while the middle spin bearing motors are of the hysteresis, synchronous, alternating current type. With the exception that the middle spin structures are two in number, and are driven in opposite senses or directions, the systems of FIG. 1 and FIG. 2 operate identically. Since the intermediate members 56 and 58 are rotating in constant directions at speeds higher than the angular velocity of the reaction wheel 30', there is no loss of hydrodynamic gas bearings 68 or 70 between the intermediate members and the inner and outer rotary members 16' and 30'. While the embodiment of FIG. 2 appears to be more complex and difficult to manufacture, this embodiment has a larger load safety margin and additional advantages may be derived from the twin torque approach to driving the reaction wheel 30'.

Figure 3:
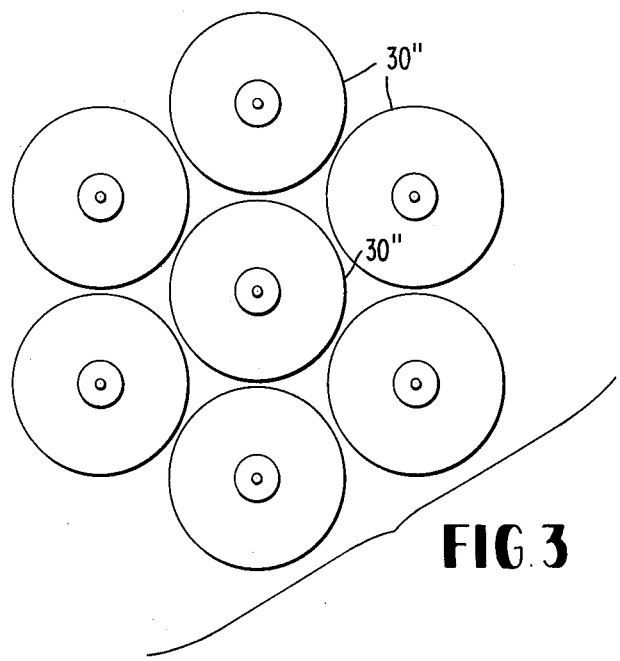
FIG. 3 is a schematic, elevational view of a multiple rotor, momentum exchange system for a given spin axis comprising a series of reaction wheels incorporating the present invention.

Depending upon the environment of use, the reaction wheel assemblies of the present invention may be fabricated to any size. However, fabrication tolerances may require, for the total momentum capability, that the assembly comprises a number of relatively small wheel modules per axis as indicated in FIG. 3. The reaction wheels 30'' are mounted for rotation about parallel axes conforming to one spin axis of the spacecraft or like vehicle carrying the same. The present invention lends itself to a multiple reaction wheel assembly, although the extremely close tolerances required of this type of gas bearing constitutes an adverse limitation on large single bearing assemblies, such as those of FIG. 1 and FIG. 2, due to material microcreep and differential expansion resulting from large temperature gradients. The multiple assembly of FIG. 3 also permits system operation in the event of module failure if the total momentum is oversize.

Referring next to FIG. 4, a sectional view of a practical embodiment of the present invention is illustrated in terms of a reaction wheel assembly or momentum exchange actuator 110 which is constructed along the lines of the schematic illustration of FIG. 1. In this regard, a hermetically sealed case or housing 112, consists of two sections. A semi-spherical cover 101 terminates in an annular flanged lip 102 and permits the same to be coupled in edge sealed fashion to a modified circular mounting plate 103 forming the second section of the housing. The cover 101 may be of cast aluminum or other light weight material as may be plate 103. The plate 103 is provided with a peripheral recess 104 which carries an annular groove 105 within which is positioned an O-ring 106 which seals plate 103 and cover 101 at their peripheries. Mounting plate 103 is provided with a central hub 107 which projects inwardly and towards the center of cover 101, the hub having fixedly coupled thereto an assembly of two back to back hemispheres 108 and 109 which define therebetween the inner bearing member 116. In this respect, a plurality of pins or dowls 111 locate the right hand hemisphere 109 relative to hub 107, while paired pins or dowls 113 locate the two hemispheres 108 and 109 together. An optical encoder support bracket 117 carries dowl 115 which is received within a hole 119 bored within the flat outer end of the left hand hemisphere 108. A relatively large diameter hole 121 is drilled through bracket 117, both hemispheres 108 and 109 and partially through the hub 107 and is threaded at 125 within hub 107. A mounting bolt 123 passes through the bracket 117, both hemispheres 108 and 109 and, at its inner end, is threaddedly coupled to hub 107, thus securing the inner bearing member 116 in appropriate central position with respect to the other elements of assembly 110. All of the other elements are mounted for relative rotation upon and about the stationary inner bearing member 116, in similar fashion to the schematic embodiment of FIG. 1. Unless otherwise designated, the parts making up the assembly may be formed by light weight metal, except in case of the electrical drive motors wherein the members must have the capability of carrying magnetic flux. The purpose of employing the two hemispheres 108 and 109 to define the inner bearing member 116 is to provide a configuration in which the members rotating about the axis defined by the inner bearing member 116 are centered relative to this member. In this regard, a middle or intermediate bearing member 124 is formed by back to back cup shaped members 127 and 129 whose dimensions are such that the outer ends of the cap shaped members pass axially well beyond the ends of the hemispheres 108 and 109 within which these members are seated. Cup shaped members 127 and 129 are essentially bottomless, with their inner ends abutting and locked together as at 131. In turn, the middle bearing member 124 carries for rotation about its axis which is common with the inner bearing member 116 an outer bearing member 131, which constitutes an annular metal member whose inner periphery is defined by intersecting semi-spherical surfaces 133 and 135, the configuration of the same conforming to the outer peripheral surface configuration of the middle bearing member 124.

Essentially, the both peripheral surfaces of the middle bearing member 124 conform respectively to the outer periphery of the inner bearing member 116 and the inner periphery of the outer bearing member 131. As in the schematic embodiment of FIG. 1, the relative rotation of these three bearing members 116, 124 and 131 create self induced hydrodynamic air bearings (assuming air constitutes the fluid within the sealed casing or housing 112) and wherein the members are spaced from each other and rotate in a relatively frictionless manner during operation of the momentum exchange actuator 110.

The outer bearing member 131 has an essentially flat outer periphery and forms a part of the reaction wheel or rotor 130 constituted further by an inner hub 139 and a thin disc portion 141 which couples the inner hub 139 to the inertia rim 143 at its outer periphery.

The circular mounting plate 103 is provided with an internal, integral, annular support or mounting ring 114, which is concentric with hub 107 and spaced radially therefrom. The reaction wheel or rotor 130 is driven in either direction by a reaction wheel drive motor indicated generally at 136 to the right of the reaction wheel 130. Motor 136 comprises an annular stator 138 which is fixed to mounting ring 144 and spaced slightly from a concentric, axially aligned reaction wheel drive motor rotor 140. In this regard, the inner hub 139 of the reaction wheel 130 is provided with a peripheral recess 145 of a depth and a width corresponding to rotor 140, within which the annular rotor 140 rests. Rotor 140 is fixed to hub 139 of the reaction wheel and rotates therewith. In like manner to the embodiment of FIG. 1, motor 136 may be essentially a brushless D.C. or A.C. motor, and causes when energized rotation of the reaction wheel or rotor 130 in either direction at a given speed.

To the right of reaction wheel drive motor 136 there is provided on the same annular support or ring 144 a middle spin bearing motor 150 constituted essentially by a fixed annular stator 148 and a concentric rotor 152 internally of the same. Rotor 152 is in the form of an annular member having an L-shaped cross section and being fixed to the outer end 154 of the middle bearing member 124 by suitable mounting bolts 147. The middle spin bearing motor 150 may be of the hysteresis, synchronous alternating current type, or of the brushless D.C. type as desired. It is noted in conjunction with the configuration of the middle bearing member 124 that in addition to the right hand end of the same extending axially beyond the inner middle bearing member 116 and the outer bearing member 131, the purpose of which is to permit the rotor 152 to be fixed to one end of the same, the axial protrusion at the opposite end acts to counterbalance the weight of the attached rotor 152. In like manner to the previous embodiment of FIG. 1 it is a requirement of the invention that the intermediate or middle bearing member 124 be driven at a speed which is substantially higher than the angular velocity given to reaction wheel 130 by the reaction wheel drive motor 136, when it is being driven in the same direction as the middle bearing member 124. In fact, the parameters involved in operating the practical embodiment of FIG. 4 are generally the same as that discussed in the operation of the schematic embodiment of FIG. 1. In addition to those elements illustrated in FIG. 1, the practical embodiment of FIG. 4 further includes the provision of an optical encoder indicated generally at 149, which includes a rotatable encoder ring 151 constituting an annulus which is fixed to the reaction wheel 130 to the side of the inner hub 139 opposite that of the reaction wheel drive motor rotor 140, the ring 151 carrying contrasting indicia and permitting the fixed element 153 of the optical encoder to sense rotation of the reaction wheel and measure the relative rotation between the reaction wheel and the fixed shaft defined by the inner bearing member 116 and hub 107. The optical encoder itself constitutes no portion of the present invention and may take the form of a standard commercial product such as that produced by the Teledyne Gurley Corporation. Essentially, a photodiode 155, for instance, facing one edge of the rotating ring 151 senses by way of reflected or transmitted light the code markings carried by the wheel as they move past the stationary photodiode 155 supported by fixed bracket 117. The mounting plate 103 is provided with a number of mounting lugs 157 at circumferentially spaced positions carrying holes 159 permitting bolt mounting of the momentum exchange actuator 110 in a desired position within a space vehicle for instance.

Since the intermediate rotary member or middle bearing member 124 is always driven at a speed higher than the rotatably driven reaction wheel 130, regardless of the cessation of motion of the reaction wheel 130 relative to the fixed axis defined by the hub 102 and the inner bearing member 116, there is no loss in the hydrodynamic inner and outer gas bearings within gaps 132 and 134 and thus under no circumstances will there be contact between the middle bearing member 124 and the fixed inner bearing member 116 or between the reaction wheel 130 and the middle bearing member 124, after start up. Further, in similar fashion to the previous embodiment, the momentum exchange actuator or reaction wheel assembly 110 may be modified such that the reaction wheel 130 is relatively fixed in which case the inner bearing member 116 would be driven as would the middle bearing member 124, but in this case the operating parameters would be basically the same.

While the invention has been particularly shown and described with reference to the preferred embodiments thereof, it will be understood by those skilled in the art that various changes in form and details may be made therein without departing from the spirit and scope of the invention.

What is claimed is:

1. In a momentum exchange actuator including relatively movable first and second generally concentric, rotary members mounted for rotation about a common axis and first driving means for bidirectionally driving one member relative to the other about said axis, the improvement comprising:

at least one intermediate third member positioned between said first and second members and generally concentrically thereto for rotation about said axis, second driving means for driving said intermediate member substantially faster than said driven one member when said intermediate member is rotated in the same direction as said one member, and hydrodynamic fluid bearing means carried by said intermediate member on both surfaces thereof, responsive to rotation of said intermediate member and acting respectively on said first and second members, whereby, regardless of reversal in direction of motion or cessation of motion between said first and second members, there is no loss of the hydrodynamic fluid bearing between said intermediate member and said first and said second members.

2. The momentum exchange actuator as claimed in claim 1, wherein first, second and third members are annular, said inner member is fixed and is constituted by back-to-back hemispheres, said intermediate member comprises back-to-back bottomless cup-shaped members and said outer member includes an inner periphery defined by intersecting semi-spherical surfaces whereby said interfitting members permit said hydrodynamic fluid bearings, created as a result of relative motion between said three members, to act thereon and stabilize said members during rotation at predetermined axially centered positions.

3. The momentum exchange actuator as claimed in claim 1, wherein said first, second and third members are annular, said first member comprises the inner member and is fixed, and said first driving means comprises an electrical motor including an annular stator fixed to said first member, and a spaced annular concentric rotor fixed to said second member in juxtaposition thereto, and said second driving means comprises an electrical motor including an annular stator fixed to said first member, and a spaced annular, concentric rotor fixed to said intermediate member and in juxtaposition to said annular stator.

4. The momentum exchange actuator as claimed in claim 3, wherein said first member comprises back-to-back hemispheres, said third member comprises back-to-back bottomless cup-shaped members concentric therewith and in surface conformation therewith, and said second member has its inner periphery defined by intersecting semispherical surfaces, whereby the opposed surfaces of respective first, second and third members conform to each other during rotation and effect axial centering therebetween, as a result of the creations of said hydrodynamic fluid bearings.

5. The momentum exchange actuator as claimed in claim 4, further comprising a housing surrounding said members and including a central hub coaxial with and fixed to one of said hemispheres, an annular support carried by said housing, concentric with said hub and radially spaced therefrom, said annular support supporting in axially spaced fashion said annular stators of said first and second driving means and wherein the edge of said third annular member extends axially beyond the ends of said second annular member and means for fixing the annular rotor of said second driving means to the end of said third annular member and in coaxial alignment with the annular rotor of said first driving means but axially spaced therefrom.

6. The momentum exchange actuator as claimed in claim 2, wherein said first and second motor stators are fixed to opposite ends of said first member and axially beyond the hydrodynamic fluid bearings.

7. The momentum exchange actuator as claimed in claim 6, wherein said first, second and third members are generally cylindrical in form, said first member includes a recess within its outer periphery, said second member includes an annular projection extending radially inward and received within said recess and defining a combined radial and axial hydrodynamic fluid bearing, and said intermediate member includes an annular recess within its outer periphery with said second member being partially received therein to define an axial and radial hydrodynamic fluid bearing therebetween.

8. The momentum exchange actuator as claimed in claim 1, wherein said first member comprises a fixed annular, inner member, said intermediate members are annular and are two in number, being positioned respectively, on opposite sides of a center line passing through said second member, said second driving means comprises electric motors including annular stators carried by said first member and annular rotors carried respectively by said intermediate members, said rotors for said intermediate members being respectively driven in opposite directions and at speeds substantially faster than said driven second member when a given intermediate member is rotated in the same direction as said second member.

9. The momentum exchange actuator as claimed in claim 8, wherein said first member includes two axially spaced annular recesses within its outer periphery, said second member includes two axially spaced corresponding recesses within the inner periphery of the same, said intermediate members are annular in form and positioned within respective recesses and define a combined axial and radial hydrodynamic fluid bearing therebetween, each intermediate member includes a cylindrical extension portion extending axially beyond the end of said first member and said second driving means comprises an electrical motor including an annular stator fixed to opposite ends of said first member and extending axially away from the same, and spaced annular, concentric rotors fixed to respective intermediate members on said extension portions and in juxtaposition to said stators.

10. In a momentum exchange actuator, the combination comprising:
a first member,
at least one second member surrounding said first member,
a third member surrounding said second member,
said first and second members defining a pair of juxtaposed surfaces,
said second and third members defining another pair of juxtaposed surfaces,
one of said first and third members being rotatably fixed and the other of said first and third members and said second member being rotatable,
means for driving said one member,
means for driving said second member relative to said first and third members at speeds greater than the rotative speeds between said second member and said one member regardless of the direction of rotation of said one member, and
hydrodynamic fluid bearing means formed by said second member and acting on said first and third members,
whereby, regardless of loss of relative motion between said first and third members, there is no loss of the hydrodynamic fluid bearings between said second, said first and said third members.

11. The momentum exchange actuator as claimed in claim 10, wherein said first member comprises a fixed, inner member, and said first driving means comprises an electrical motor including a stator fixed to said first member, and a spaced, concentric rotor fixed to said second member in juxtaposition thereto, and said second driving means comprises an electrical motor including a stator fixed to said first member, and a spaced, concentric rotor fixed to said second member and in juxtaposition to said stator.

12. The momentum exchange actuator as claimed in claim 10, wherein said first member comprises a fixed, inner member, said second members are two in number and are positioned on opposite sides respectively of a center line passing through said third member at right angles to the common axis, said first and second driving means comprise electric motors including stators carried by said first member, and rotors carried respectively by said second and third members, said electrical motors associated with said second members being respectively driven in opposite directions and at speeds substantially faster than said motor driving said third member.

* * * * *